United States Patent
Chapman et al.

[19]

[11] Patent Number: 5,988,548
[45] Date of Patent: Nov. 23, 1999

[54] EASY HOLD FISHING REEL BODY

[75] Inventors: John W. Chapman, Franksville; Christopher F. Kreuser, Kenosha, both of Wis.

[73] Assignee: Johnson Worldwide Associates, Sturtevant, Wis.

[21] Appl. No.: 09/078,824

[22] Filed: May 14, 1998

[51] Int. Cl.$^6$ ............................................. A01K 89/015
[52] U.S. Cl. .................... 242/310; 242/311; D22/140
[58] Field of Search ................... 242/310, 311; D22/140, 141

[56] References Cited

U.S. PATENT DOCUMENTS

| | | | |
|---|---|---|---|
| D. 261,297 | 10/1981 | Sakamoto et al. | D22/140 |
| D. 269,899 | 7/1983 | Shohoji et al. | |
| D. 280,846 | 10/1985 | Sakamoto et al. | |
| D. 320,834 | 10/1991 | Robbins et al. | |
| D. 346,006 | 4/1994 | Sakurai et al. | |
| D. 347,046 | 5/1994 | Sakurai. | |
| D. 347,460 | 5/1994 | Ohi | D22/140 |
| D. 349,149 | 7/1994 | Roberts et al. | D22/140 |
| D. 351,451 | 10/1994 | Storz | D22/140 |
| D. 366,690 | 1/1996 | Storz | D22/140 |
| D. 369,642 | 5/1996 | Iwabuchi | D22/140 |
| D. 392,366 | 3/1998 | Asano et al. | D22/140 |
| 2,170,186 | 8/1939 | Catron. | |
| 3,556,427 | 1/1971 | Lemery | 242/310 X |
| 4,821,978 | 4/1989 | Kaneko. | |
| 4,830,306 | 5/1989 | Tsunoda et al. | |
| 5,183,221 | 2/1993 | Kawai et al. | 242/310 |
| 5,503,345 | 4/1996 | Kaneko. | |
| 5,816,518 | 10/1998 | Miyazaki | 242/310 |
| 5,829,701 | 11/1998 | Murayama et al. | 242/310 |

*Primary Examiner*—Donald P. Walsh
*Assistant Examiner*—Emmanuel M. Marcelo
*Attorney, Agent, or Firm*—Foley & Lardner

[57] ABSTRACT

A fishing reel body includes a first side; a second line retrieval handle side opposite the first side; a bridge extending between the first and second sides, the bridge supporting a thumb rest portion; a convex surface on the second side configured to extend into the user's palm and an arcuate elevated contour on the second side and configured to extend within the notch between the user's thumb and index finger. The arcuate elevated contour preferably extends substantially adjacent to the thumb rest portion so as to support the user's thumb on the thumb rest portion away from the user's fingers.

23 Claims, 3 Drawing Sheets

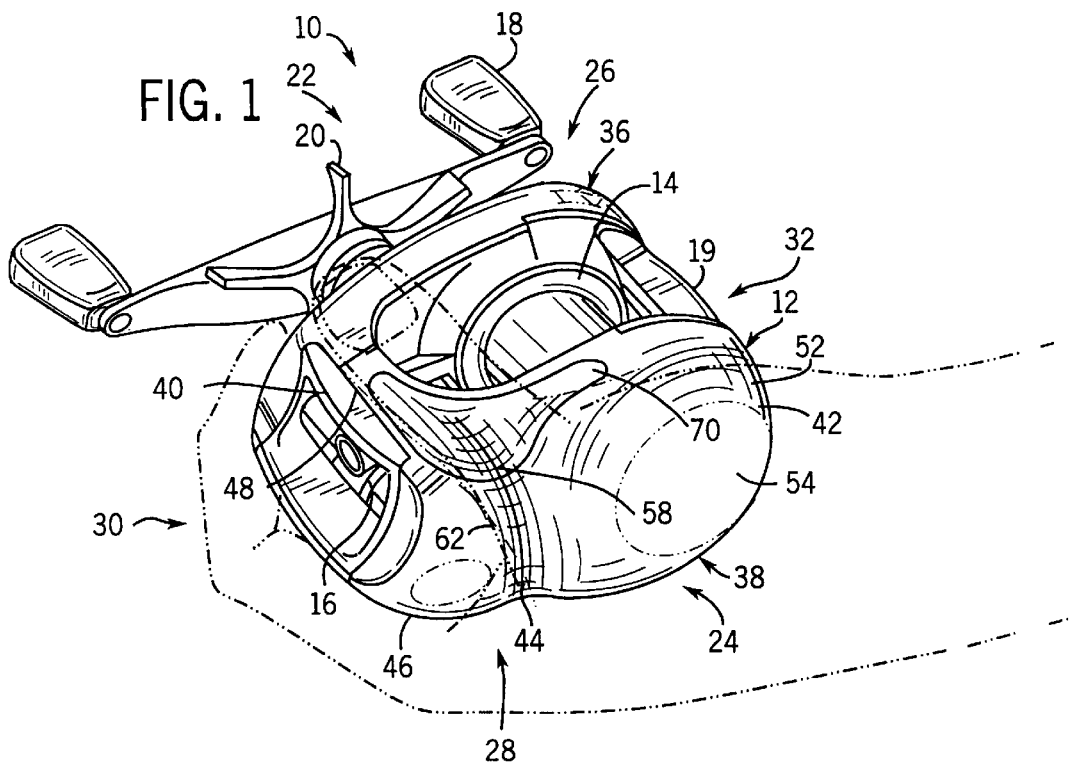
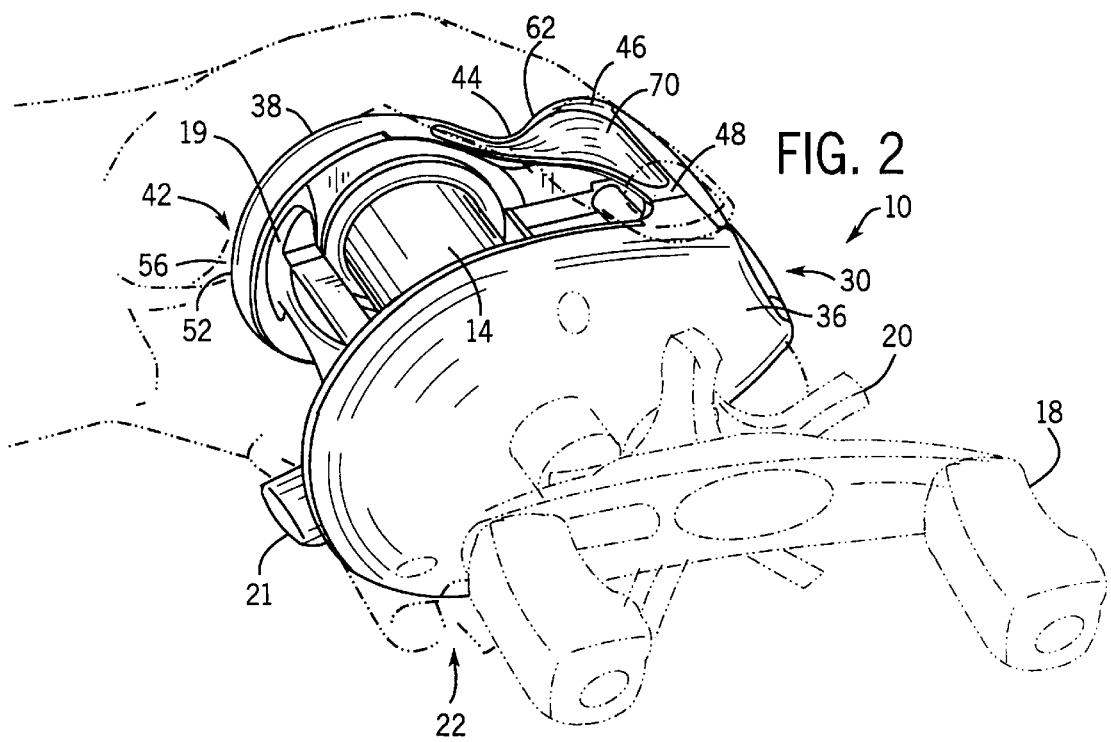

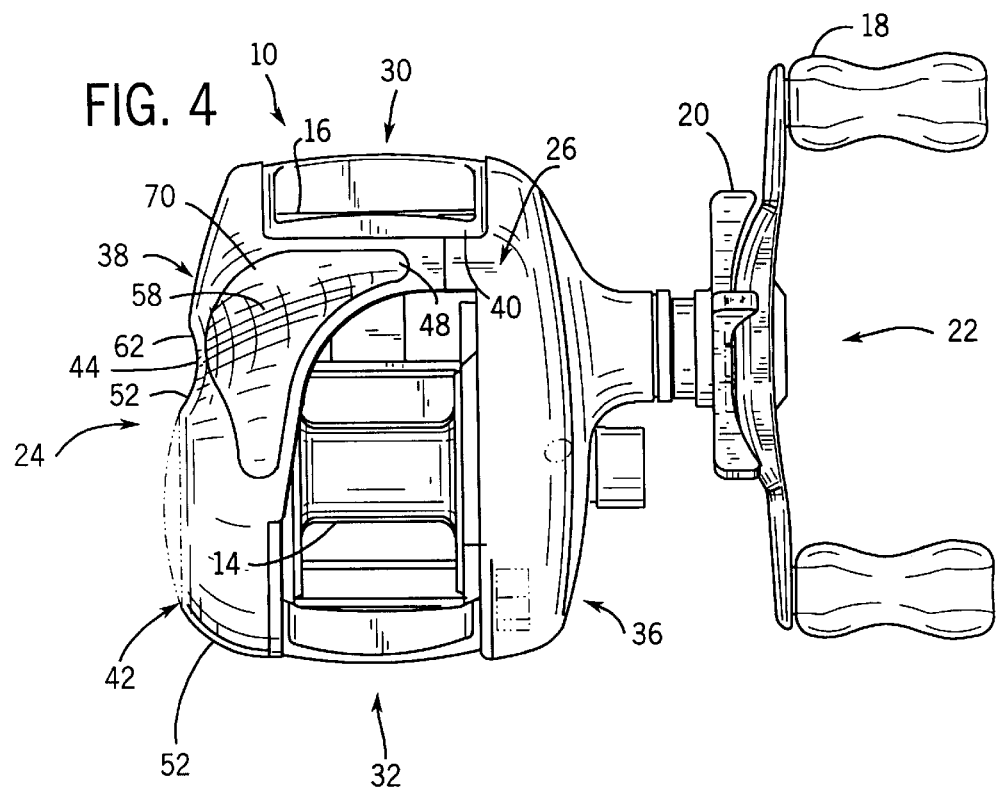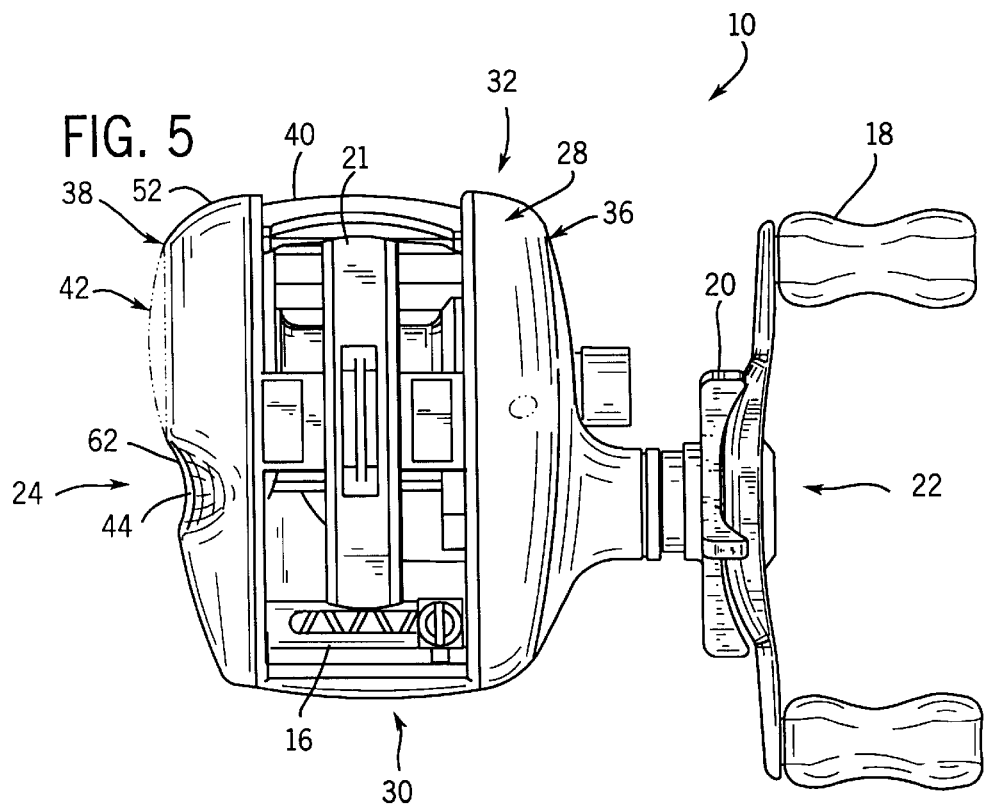

EASY HOLD FISHING REEL BODY

RELATED CO-PENDING APPLICATION

This application is related to copending U.S. Patent Application Serial No. 29/088,060, entitled "Bait Cast Fishing Reel" by John W. Chapman and Christopher F. Kreuser, filed on the same date herewith, the full disclosure of which is hereby incorporated by reference.

FIELD OF THE INVENTION

The present invention relates to bait cast fishing reel bodies. In particular, the present invention relates a side of a bait cast fishing reel body configured to better mate with the user's hand so as to provide the user with a more reliable and less fatiguing grasp of the fishing reel.

BACKGROUND OF THE INVENTION

Bait cast fishing reel bodies typically include a first handle side on which a line retrieval handle or crank is exposed, a second side opposite the first side, a spool rotatably supported between the first and second side and a strut or bridge interconnecting the first and second sides forward the spool. To retrieve fishing line using a right handed reel, the user will typically grasp the second side of the reel with his or her left hand while rotating the handle with his or her right hand. With left handed reels, the user's hands are reversed.

Although extremely popular, conventional bait cast fishing reels are often difficult and fatiguing to grasp and hold, especially after prolonged use or when fighting and reeling in a fish. In an attempt to reduce this fatigue and to improve the user's grasp, some fishing reel bodies include a thumb rest portion supported by the strut or bridge. In an attempt to further reduce fatigue and improve the user's grasp, some fishing reel bodies additionally form the thumb rest portion as well as the second side from soft material. An example of such a fishing reel is disclosed in U.S. Pat. No. 4,821,978. However, neither providing a thumb rest portion nor forming the thumb rest portion and the second side out of a soft material adequately reduce fatigue or improve the user's grasp of the reel body.

Thus, there is a continuing need for a fishing reel body and, in particular, a side of a fishing reel body opposite the handle side which is easy to grasp and which is less fatiguing on the user's hand, thumb and fingers.

SUMMARY OF THE INVENTION

The present invention is directed to a fishing reel body including a first side and a second line retrieval handle side opposite the first side. The second side includes a convex surface configured to extend into the user's palm and an arcuate elevated contour forward the convex surface and configured to abut a notch of the user's hand between the user's thumb and index finger.

According to one aspect of the present invention, the body additionally includes a concave surface extending between the convex surface and the arcuate elevated contour. The concave surface preferably includes a soft portion. According to another aspect, the body has a first width adjacent the convex surface and a second width adjacent the arcuate elevated contour, wherein the body includes a neck portion having a third width less than the first width and the second width. Preferably, the concave surface extends along the neck portion.

According to another aspect of the present invention, the body includes a thumb rest surface extending from the arcuate elevated contour towards the first side. The arcuate elevated contour preferably extends adjacent to a front portion of the thumb rest surface. The thumb rest preferably includes a soft portion. The body preferably additionally includes a smooth transition zone between the concave surface and the thumb rest surface. The smooth transition zone also preferably includes a soft portion.

The present invention is also directed to a fishing reel body including a first line retrieval handle side, a second side opposite the first side, a bridge extending between the first and second sides to support a thumb rest surface and an arcuate elevated contour on the second side. The arcuate elevated contour is configured to fit within the notch between the user's thumb and index finger. The arcuate elevated contour extends substantially adjacent to a front portion of the thumb rest surface so as to support the user's thumb on the thumb rest surface away from the user's fingers.

The present invention is also directed to a fishing reel body including a first handle side, a second side opposite the first handle side, a bridge extending between the first and second sides so as to support a thumb rest surface and a concave soft surface extending at least partially along the second side and smoothly transitioning with the thumb rest surface.

BRIEF DESCRIPTION OF THE DRAWINGS

FIG. 1 is a front perspective view of an exemplary bait cast fishing reel of the present invention being grasped by a user's hand which is shown in phantom.

FIG. 2 is a rear elevational view of the bait cast fishing reel of FIG. 1.

FIG. 4 is a top plan view of the bait cast fishing reel of FIG. 1.

FIG. 5 is a bottom plan view of the bait cast fishing reel of FIG. 1.

DETAILED DESCRIPTION OF THE PREFERRED EMBODIMENT

Figure 3:
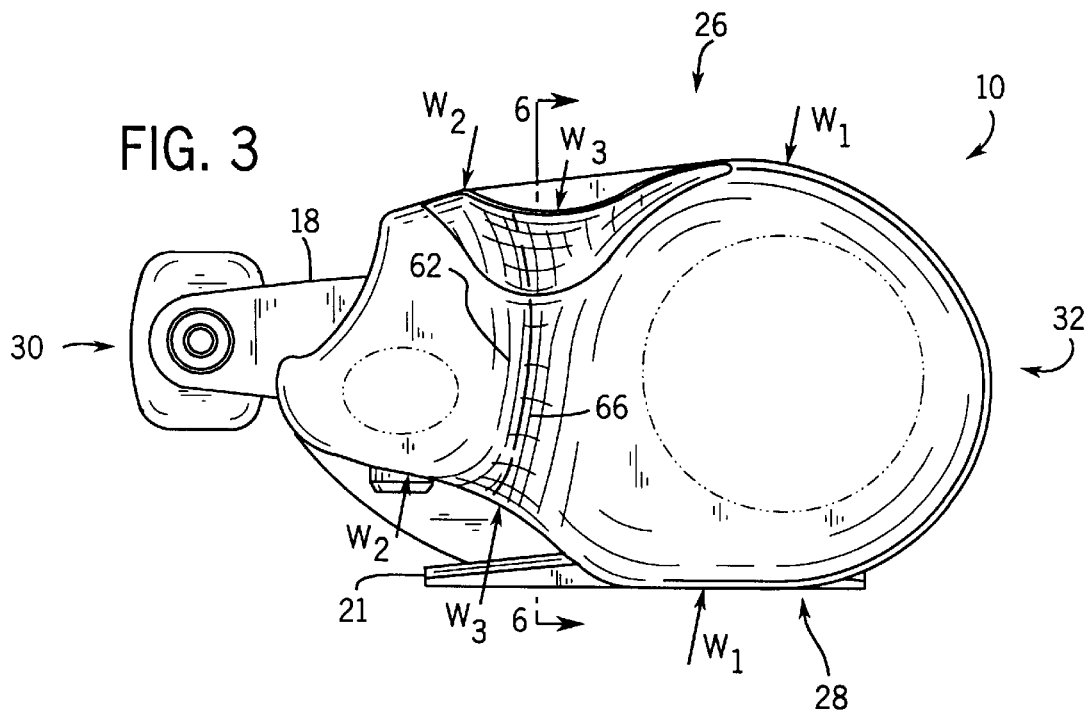
FIG. 3 is a front elevational view of the bait cast fishing reel of FIG. 1.

FIGS. 1 through 6 illustrate bait cast fishing reel 10 which generally includes body 12, spool 14, line guide 16, crank 18, clutch 19, drag control 20 and reel mount 21. Body 12 houses and supports the remaining components of fishing reel 10 and includes handle side 22, gripping side 24, top 26, bottom 28, front 30 and rear 32. Body 12, which will be described in greater detail hereafter, enables fishing reel 10 to be more easily grasped for prolonged periods of time with less fatigue.

Spool 14 is rotatably supported by body 12 between sides 22 and 24. Spool 14 is conventionally known and is rotatably coupled to body 12 between sides 22 and 24 so as to rotate about an axis extending between sides 22 and 24. Spool 12 is operably coupled to spool drive means and drag means (not shown) which are conventionally known and which are housed within body 12. Spool 14 is configured for carrying fishing line which is wrapped thereabout and which is threaded through line guide 16.

Line guide 16 extends between sides 22 and 24 at front 30 of body 12. Line guide 16 reciprocates from side to side of body 12 during the rotation of spool 14 and during the retrieval of fishing line to evenly distribute the fishing line across the width of spool 14.

The spool drive means (not shown) is conventionally known and is operably coupled between spool 14, line guide 16 and crank 18. The spool drive means typically comprises gear 9 train coupled to crank 18. Upon being driven by crank 18, the spool drive means rotates spool 14 and reciprocates line guide 16 in a conventionally known manner to retrieve the fishing line.

The drag means (not shown) is conventionally known and is operably coupled to spool 14. The drag means retards the rotation of spool 14 and the corresponding release of fishing line from spool 14 in a conventionally known manner when clutch 16 is engaged. The extent to which the drag means retards the rotation of spool 16 is adjusted by drag control 20.

Clutch 19 is conventionally known and is operably coupled between spool 14 and both the spool drive means and the drag means. Clutch 19 extends between sides 22 and 24 at rear 30 of body 12. When clutch 19 is engaged, the spool drive means and the drag means are operably coupled to spool 14. As a result, rotation of crank 18 rotates spool 16 to retrieve fishing line. At the same time, the drag mechanism retards reverse rotation of spool 14 to release the fishing line. Depressment of clutch 19 uncouples spool 14 from the spool driving means and drag means. As a result, spool 14 is substantially free to rotate in the reverse direction to release fishing line such as during casting.

Reel mount 21 extends from bottom 28 of body 12 and is configured for mounting reel 10 to a conventionally known fishing rod. Mount 21 preferably extends from front 30 towards rear 32.

Referring to each of FIGS. 1–6, body 12 more specifically includes side covers 36, 38 and bridge 40. Side covers 36 and 38 extend along sides 22 and 24 of body 12. Side cover 36 houses the drive means and the drag means adjacent to crank 18 and drag control 20.

Side cover 38 extends along side 24 opposite side cover 36 and provides an outer surface for being grasped by the person fishing. Side cover 38 generally includes palm engaging portion 42, channel 44, notch abutting portion 46 and thumb rest portion 48. In the preferred embodiment illustrated, side cover 38 comprises a single unitary body forming and providing each of the palm engaging portion 42, channel 44, notch engaging portion 46 and thumb rest portion 48. As a result, side cover 38 contains few, if any, material breaks which may inhibit reliable gripping of reel body 12. Alternatively, palm engaging portion 42, channel 44, notching engaging portion 46 and thumb rest 48 may be formed as part of separate and distinct components which may or may not be moveable relative to one another.

Palm engaging portion 42 extends along a rear portion of side cover 38 proximate to the rotational axis of spool 14. The palm engaging portion 42 has a generally annular convex surface 52 sized and located so as to project into the cavity of the user's palm. Although the palm engaging portion 42 is illustrated as including a generally flat planar end portion 54 for purely aesthetic reasons, the palm engaging portion 42 may alternatively have a variety of different generally circular convex surface shapes such as a semi-circular, elliptical or semi-elliptical ball or bulb configured to project into the user's palm. Furthermore, although convex surface 52 is illustrated as concentrically extending about the rotational axis of spool 14 for aesthetic reasons, convex surface 52 may be eccentrically offset relative to the rotational axis of spool 14. Because the palm engaging portion 42 projects into the cavity 56 of the user's palm as illustrated by FIG. 2, side 24 of reel body 12 better conforms to the user's palm, is more easily gripped and is less fatiguing to grasp for prolonged periods of time.

Channel 44 extends between palm engaging portion 42 and notch engaging portion 46. Channel 44 arcuately extends toward side 22. Channel 44 is sized for receiving the base of the user's index finger and the base of the user's thumb. As a result, channel 44 facilitates the secure and reliable positioning of the user's thumb and forefinger about reel body 12. In the preferred embodiment, channel 44 is a generally concave depression extending between palm engaging portion 42 and notch engaging portion 46.

Channel 44 includes a transitioning portion or zone 58 transitioning between side 24 and top 26 of reel body 12. Because transitioning zone 58 is preferably rounded or arcuate, zone 58 provides a smooth transition, absent any edges or corners, between side 24 and top 26. Because reel body 12 has a smooth transitioning zone between side 24 and top 26, there are no sharp or projecting corners or edges which inhibit gripping of reel body 12.

Notch engaging portion 46 of reel body 12 projects from reel body 12 proximate to front 30 along side 24. Notch engaging portion 46 extends forward of spool 14 adjacent to line guide 16. Notch engaging portion 46 includes an arcuate elevated contour 62 configured to fit within the notch, also known as the edge of the "snuffbox," between the user's thumb and index finger. Contour 62 arcuately extends towards front 30. Contour 62 extends substantially adjacent to thumb rest portion 48. As a result, arcuate elevated contour 62 supports the user's thumb on the thumb rest portion away from the user's fingers. Thus, the user does not need to raise or lift the thumb away from the reel body so as to position his or her thumb on thumb rest portion 48. In contrast, the user's thumb remains in constant contact with contour 62 from side 24 to top 26 of reel body 12. As a result, reel body 12 is easier to grasp and is less fatiguing to hold for prolonged periods of time. Because contour 62 is preferably arcuate in shape, contour 62 fits within the notch of the user's hand without any projecting corners or edges which would otherwise detract from the gripability of body 12 and which would also increase the fatigue associated with gripping body 12 for prolonged periods of time. As will be appreciated, notch engaging portion 46 may have a variety of other shapes and configurations while still providing an arcuate elevated contour which extends along side 24 and which continues upward adjacent to transition zone 58 and thumb rest portion 48. For example, notch engaging portion 46 may alternatively comprise a semi-circular or semi-elliptical ball or bulb projecting along side 24 forward channel 44.

As best shown by FIG. 3, palm engaging portion 42 and notch engaging portion 46 each preferably have maximum radii or widths $W_1$ and $W_2$, respectively, greater than the width $W_3$ of body 12 extending along channel 44. As a result, the portion of body 12 extending along channel 44 has a reduced width so as to form a narrower throat or neck portion 66. This reduced width neck portion 66 further facilitates the positioning of the user's index finger below body 12 and the positioning of the user's thumb above body 12 along thumb rest portion 48 to improve the gripability of reel body 12.

Thumb rest portion 48 extends across bridge 40 above bridge 40 between the axis of spool 14 and line guide 16. Thumb rest portion 48 smoothly transitions into zone 58 as well as channel 44. Thumb rest portion 48 provides a surface against which the user's thumb may rest between spool 14 and line guide 16 towards front 30 of reel 10. As will be appreciated, the exact shape and configuration of thumb rest portion 48 may be considerably varied to optimize the aesthetic appearance while still maintaining its functionality.

Figure 6:
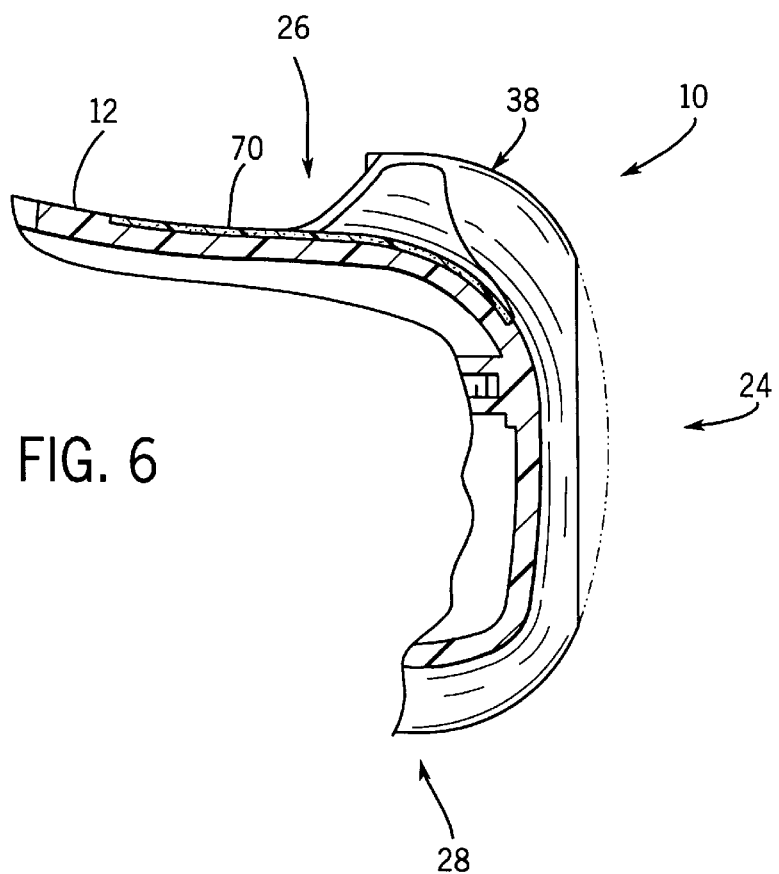
FIG. 6 is a sectional view of the bait cast fishing reel of FIG. 3 taken along lines 6—6.

As further shown by FIGS. 3, 4 and 6, channel 44, notch engaging portion 46 and thumb rest portion 48 each include a portion of which is soft and somewhat compressible. In particular, body 12 includes a soft touch grip pad 70 made of an elastomer such as rubber or silicone which is inset within the metallic portion of side cover 38. Pad 70 extends through and within channel 44, contour 62 and thumb rest 48. As a result, pad 70 provides a soft easily gripable surface adjacent to the notch of the user's hand as well as beneath the user's thumb upon thumb rest 48. Because pad 70 conforms to the shape of channel 44, including transition zone 58, pad 70 is arcuate and partially encircles the user's thumb and the notch between the user's thumb and index finger. Consequently, pad 70 contacts the larger portion of the user's thumb and the notch between the user's thumb and index finger to facilitate better gripping of reel body 12. As will be appreciated, pad 30 may have various shapes and configurations. Moreover, although less desirable, pad 70 may alternatively project from the surrounding surface of side cover 38.

In the exemplary embodiment of body 12 illustrated, convex surface 52 has a height of approximately 14 millimeters and a radius of approximately 15 millimeters. Channel 44 has a width of approximately 12 millimeters and a radius of approximately 14.74 millimeters. Arcuate elevated contour is generally arcuate with a radius of approximately 16 millimeters. Thumb rest portion 48 has an upper arcuate contour with the radius of approximately 19.38 millimeters. As will be appreciated, the dimensions and radii will vary depending upon the size of the bait cast fishing reel. Moreover, these dimensions may be varied to some extent while still maintaining the functional advantages of body 12.

Overall, bait cast fishing reel body 12 provides a bait cast fishing reel body which is easy to grasp and which is less fatiguing on the user's hand, thumb and fingers. When bait cast fishing reel body 12 is grasped by the user, the palm engaging portion 42 projects into the cavity of the user's palm in substantially continuous contact with the user's palm to prevent slipping and to provide support of the user's hand. At the same time, channel 44 receives the user's index finger and thumb and securely retains the user's index finger and thumb in a secure, comfortable position. Channel 44 continuously supports the user's thumb through transition zone 58 onto thumb rest portion 48 without any corners or edges. Consequently, the user does not need to lift his or her thumb or support his or her thumb away from body 12 to position the thumb upon thumb rest portion 48. Because channel 44 extends along the narrower neck portion of body 12, the user's fingers more easily extend below rear body 12 while the user's thumb more easily extends above rear body 12 onto thumb rest portion 48. To further support the user's hand and to prevent the user's hand from slipping relative to rear body 12, rear body 12 additionally includes an arcuate elevated contour which is configured to mate with the notch of the user's hand between the user's thumb and index finger. Because the arcuate elevated contour extends adjacent to a front portion of the thumb rest portion, the arcuate elevated contour continuously supports the user's thumb on the thumb rest surface away from the user's fingers. In the exemplary embodiment illustrated, at least one of the transition zone, the channel and the thumb rest portion include soft padded portions. Body 12 preferably includes a concave soft surface which smoothly transitions with the thumb rest surface. Because the surface is concave, the surface partially encircles the user's thumb to provide a more secure and comfortable fit with the user's hand.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

We claim:

1. A fishing reel body comprising:

a top:

a bottom;

a midpoint between the ton and the bottom:

a first side;

second opposite the first side, the second side including:

a convex surface configured to extend into the user's palm; and an arcuate elevated contour extending across the midpoint between the top and the bottom forward the convex surface and having a portion configured to abut a notch of the user's hand between the user's thumb and index finger.

2. The body of claim 1 including a concave surface extending between the convex surface and the arcuate elevated contour across the midpoint.

3. The body of claim 2 wherein the concave surface includes a soft elastomeric portion.

4. The body of claim 3 wherein the thumb rest portion includes a soft elastomeric portion.

5. The body of claim 1, wherein the second side has a first width adjacent the convex surface between the top and the bottom and a second width adjacent the arcuate elevated contour between the top and the bottom and wherein the second side additionally includes a neck portion having a third width between the top and the bottom less than the first width and the, second width.

6. The body of claim 5 including a concave surface extending between the convex surface and the arcuate elevated contour along the neck portion.

7. The body of claim 1 including a thumb rest portion extending from the arcuate elevated contour towards the first side.

8. The body of claim 1, wherein the convex surface, the arcuate elevated contour and the thumb rest portion are formed as part of a single integral unitary body side cover.

9. The body of claim 7 wherein the portion of the arcuate elevated contour extends adjacent to a front portion of the thumb rest portion.

10. The body of claim 7 wherein the concave surface smoothly transitions to the thumb rest portion.

11. The body of claim 10 including a smooth transition zone between the concave surface and the thumb rest portion.

12. The body of claim 11 wherein the smooth transition zone includes a soft elastomeric portion.

13. The body of claim 1, wherein the arcuate elevated contour extends substantially entirely from the, top toe the bottom along the second side.

14. A fishing reel body comprising:

a first line retrieval handle side;

a second side opposite the first side;

a bridge extending between the first and second sides, the bridge supporting a thumb rest portion; and an arcuate elevated contour on the second side and configured to fit within the notch between the user's thumb and index finger, the arcuate elevated contour extending substantially adjacent to a front portion of the thumb rest portion so as to support the user's thumb on the thumb rest portion away from the user's fingers.

15. The body of claim 14 including a convex surface rearward of the arcuate elevated contour and configured so as to project into the cavity of the user's palm.

16. The body of claim 14, wherein the second side includes a neck portion adjacent the arcuate elevated contour having a reduced width.

17. The body of claim 14 including a concave channel at least partially defined by the elevated contour and a smooth transition zone between the channel and the thumb rest portion.

18. The body of claim 17 wherein the smooth transition zone includes a first soft elastomeric portion.

19. The body of claim 18 wherein the channel includes a second soft elastomeric portion contiguous with the first soft elastomeric portion.

20. The fishing reel body of claim 14 is a convex surface rearward of the elevated contour and configured such to project into the user's palm, wherein the convex surface and the arcuate elevated contour are formed as part of a single integral unitary body side cover.

21. A fishing reel body comprising:

a top;

a bottom;

a first handle side;

a second side opposite the first handle side;

a bridge extending between the first and second sides, the bridge supporting a thumb rest portion;

a concave soft elastomeric surface extending at least partially along the second side and smoothly transitioning with the thumb rest portion; and a neck portion having a reduced width between the top and the bottom, wherein the concave soft elastomeric surface extends along the neck portion.

22. The body of claim 21 wherein the thumb rest portion and a concave soft surface are formed as part of a single integral unitary body side cover.

23. A fishing Feel body comprising:

first side;

a second opposite the first side, the second side including:

a convex surface configured to extend into the user's palm; and an arcuate elevated contour forward the convex surface and configured to abut a notch of the user's hand between the user's thumb and index finger, wherein the second side has a first portion with a first width adjacent the convex surface between the top and the bottom and a second portion with a second width adjacent the arcuate elevated contour between the top and the bottom and wherein the second side additionally includes a neck portion'between the first and second portions having a third width between the top and the bottom less than the first width and the second width.

* * * * *

UNITED STATES PATENT AND TRADEMARK OFFICE
CERTIFICATE OF CORRECTION

PATENT NO : 5,988,548
DATED : 11/23/99
INVENTOR(S) : Chapman et al.

It is certified that error appears in the above-identified patent and that said Letters Patent are hereby corrected as shown below:

In Claim 1, line 2, the ":" should be replaced with a --;--.

In Claim 1, line 4, "ton" should be replaced with --top-- and ":" should be replaced with --;--.

In Claim 1, line 6, --a-- should be inserted before the first occurrence of "second".

In Claim 23, line 1, "Feel" should be replaced with --reel--.

In Claim 23, line 2, please insert --a-- before "first".

In Claim 1, line 6, please insert --side-- between "second" and "opposite".

In Claim 23, line 3, please insert --side-- between "second" and "opposite".

Signed and Sealed this

Seventeenth Day of April, 2001

NICHOLAS P. GODICI

Attest:

Attesting Officer

Acting Director of the United States Patent and Trademark Office